(12) United States Patent
Alger

(10) Patent No.: US 8,647,709 B2
(45) Date of Patent: *Feb. 11, 2014

(54) ANTI-ICING COATINGS AND METHODS

(75) Inventor: Russell G. Alger, Hancock, MI (US)

(73) Assignee: Michigan Technological University, Houghton, MI (US)

( * ) Notice: Subject to any disclaimer, the term of this patent is extended or adjusted under 35 U.S.C. 154(b) by 700 days.

This patent is subject to a terminal disclaimer.

(21) Appl. No.: 11/857,224

(22) Filed: Sep. 18, 2007

(65) Prior Publication Data

US 2008/0066855 A1    Mar. 20, 2008

Related U.S. Application Data

(63) Continuation of application No. 11/026,442, filed on Dec. 30, 2004, now Pat. No. 7,279,197, which is a continuation of application No. 10/267,943, filed on Oct. 9, 2002, now Pat. No. 6,849,198.

(60) Provisional application No. 60/327,877, filed on Oct. 9, 2001.

(51) Int. Cl.
*B05D 5/10* (2006.01)
*E01C 5/12* (2006.01)
*B05C 1/16* (2006.01)
*B05D 1/12* (2006.01)
*B05D 1/36* (2006.01)
*B05D 7/00* (2006.01)

(52) U.S. Cl.
USPC ........... 427/138; 427/136; 427/180; 427/201; 427/207.1; 427/222

(58) Field of Classification Search
USPC .............. 427/136, 138, 180, 196, 201, 207.1, 427/214, 222; 404/72, 73, 82
See application file for complete search history.

(56) References Cited

U.S. PATENT DOCUMENTS 1,785,130 A  *  12/1930  Levy ............................. 427/138
3,245,329 A       4/1966  Nagin
3,334,555 A  *   8/1967  Nagin et al. .................... 404/31

(Continued)

FOREIGN PATENT DOCUMENTS

DE        25 12 691        9/1976
EP         0 022 055       10/1981

(Continued)

OTHER PUBLICATIONS

Jang, J-W. et al., "Effect of salt additives on concrete degradation (Phase II) Executive Summary," Published by Minnesota Department of Transportation (Feb. 1995) Report No. 96-10, 23 pages.

(Continued)

*Primary Examiner* — Michael Wieczorek
(74) *Attorney, Agent, or Firm* — Michael Best & Friedrich LLP

(57) ABSTRACT

A method of inhibiting or preventing bonding between snow or ice and a substrate. The method includes applying an adhesive to the substrate, broadcasting an aggregate onto the adhesive, the aggregate having the capacity to receive an anti-icing chemical into the aggregate, and applying the anti-icing chemical onto the aggregate so that at least a portion of the anti-icing chemical is received into at least a portion of the aggregate.

13 Claims, 13 Drawing Sheets

(56) References Cited

U.S. PATENT DOCUMENTS

| | | | |
|---|---|---|---|
| 3,619,230 A * | 11/1971 | Matthews | 427/204 |
| 3,771,893 A | 11/1973 | Miller | |
| 3,965,281 A | 6/1976 | Takase et al. | |
| 4,012,537 A | 3/1977 | Dubois | |
| 4,148,938 A | 4/1979 | Hansen | |
| 4,243,415 A | 1/1981 | Lowe, Jr. | |
| 4,296,207 A | 10/1981 | Siegmund | |
| 4,434,190 A | 2/1984 | Dubois et al. | |
| 4,474,852 A | 10/1984 | Craig | |
| 4,588,512 A | 5/1986 | Rippie | |
| 4,597,884 A | 7/1986 | Greenwald | |
| 4,692,259 A | 9/1987 | Roman | |
| 4,714,629 A * | 12/1987 | Davis et al. | 427/138 |
| 4,846,886 A | 7/1989 | Fey et al. | |
| 4,904,711 A | 2/1990 | Sellstrom et al. | |
| 4,936,915 A * | 6/1990 | Canzani | 106/13 |
| 5,114,475 A | 5/1992 | Siegmund et al. | |
| 5,352,062 A * | 10/1994 | Yoshida et al. | 404/17 |
| 5,441,760 A | 8/1995 | Pattengill et al. | |
| 5,494,741 A | 2/1996 | Fekete et al. | |
| 5,556,033 A | 9/1996 | Nachtman | |
| 5,667,718 A | 9/1997 | Jones et al. | |
| 6,323,268 B1 * | 11/2001 | Fisher et al. | 524/266 |
| 6,444,258 B1 | 9/2002 | Terry | |
| 6,849,198 B2 | 2/2005 | Alger | |
| 7,279,197 B2 | 10/2007 | Alger | |
| 2005/0051755 A1 | 3/2005 | Alger | |

FOREIGN PATENT DOCUMENTS

| | | |
|---|---|---|
| EP | 1 440 134 | 7/2004 |
| GB | 1471466 | 4/1977 |
| GB | 2083063 | 3/1982 |
| JP | 0188501 | 8/1985 |
| JP | 60-188502 | 9/1985 |
| JP | 62-160302 | 7/1987 |
| JP | 62160302 | 7/1987 |
| JP | 63-236802 | 10/1988 |
| JP | 63236802 | 10/1988 |
| JP | 63-265002 | 11/1988 |
| JP | 1163285 | 6/1989 |
| JP | 2-16186 | 1/1990 |
| JP | 10-024267 | 1/1998 |
| JP | 11-303007 | 11/1999 |
| JP | 11303007 | 11/1999 |
| JP | 2005/513311 | 5/2005 |
| SU | 546679 | 3/1977 |
| WO | WO 93/22071 | 11/1993 |
| WO | WO 03/054104 | 7/2003 |
| WO | WO 2006/015011 | 2/2006 |

OTHER PUBLICATIONS

Kandhal, P.S. et la., "Open graded asphalt friction course: state of the practice," National Center for Asphalt Technology of Auburn University, NCAT Report No. 98-7 (May 1998) 31 pages.

Martinez, F.C. et al., "Evaluation of deicer applications on open graded pavements," Final Report SPR616 for Oregon Department of Transportation and Federal Highway Administration (Apr. 2006) 32 pages.

Schlect, E., "Open graded asphalt surfaces offer . . . " Asphalt Magazine (Winter 1993-1994) 7(3):2 pages.

Japanese Patent Office Action for Application No. 2003-554812 mailed Jul. 3, 2009 (9 pages).

Japanese Patent Office Action for Application No. 2003-554812 mailed Aug. 29, 2008 (8 pages).

United States Patent Office Action for U.S. Appl. No. 10/267,943 dated Sep. 23, 2003 (6 pages).

United States Patent Office Action for U.S. Appl. No. 10/899,544 dated Mar. 24, 2005 (7 pages).

United States Patent Office Action for U.S. Appl. No. 10/899,544 dated Oct. 5, 2005 (10 pages).

United States Patent Office Action for U.S. Appl. No. 10/899,544 dated Dec. 5, 2005 (10 pages).

United States Patent Office Action for U.S. Appl. No. 10/899,544 dated Jul. 25, 2006 (5 pages).

United States Patent Office Action for U.S. Appl. No. 11/026,442 dated Oct. 7, 2005 (12 pages).

United States Patent Office Action for U.S. Appl. No. 11/026,442 dated Apr. 25, 2006 (7 pages).

United States Patent Office Action for U.S. Appl. No. 11/026,442 dated Aug. 17, 2006 (5 pages).

International Search Report for Application No. PCT/US02/32224 dated Jul. 14, 2003 (4 pages).

International Report on Patentability for Application No. PCT/US02/32224 dated Sep. 17, 2003 (4 pages).

International Search Report and Written Opinion for Application No. PCT/US2005/026581 dated Nov. 10, 2005 (7 pages).

Adam, John F. and Gansen, Elijah, Iowa Dept. of Transportation, "Performance of Poly-Carb, Inc. Flexogrid Bridge Overlay System," Dec. 2001, pp. 1-10.

Adams, E.E., et al., "Persistence of Reduced Snow to Pavement Shear Strength for Two Aggregate Materials Treated with CMA and NACL," Institute of Snow Research, Keweenaw Research Center, Michigan Technological University, Chapter 19, Jan. 19, 1992, pp. 481-493.

Alger, R.G., E. Pakkala, J. Kunnari, "Field Application of Elastomeric Coatings on a Paved Snowmobile Trail," Minnesota Department of Natural Resources, Jan. 1998, 8 pgs.

Alger, R.G., "James Bond 007 Tester Determination of Polymer Coating Bond Strength a User's Manual," Michigan Department of Transportation, Nov. 1999, 10 pgs.

Alger, R.G., E.E. Adams and F.D. Williams, "Interaction of Freezing Point Depressants and Pavement Aggregates as Applied to Snow Adhesion," Report submitted to Chevron Chemical Company, Institute of Snow Research, Michigan Technological University, Jan. 1991, pp. 1-33.

Alger, R.G., H. Miller, E. Pakkala, "Research of Elastomeric Concretes for Surface Patching of Pavements at Snowmobile Trail Road Crossings," Michigan Department of Transportation, Aug. 1998, 230 pgs.

Alger, R.G., J. Vizanko, "Evaluation of De-Bonding of Multiple Layer Polymer Concrete Bridge Deck Overlays," Michigan Department of Transportation, Nov. 1999, 15 pgs.

Alger, R.G., J. Wegleitner, "Aggregate Absorption as Related to Anti-Icing for Elastomeric Bridge Deck Overlays," Michigan Department of Transportation, Dec. 7, 2001, 28 pgs. *Although the corresponding page indicates Sep. 2000, the first date it was disclosed was Dec. 7, 2001.

Alger, R.G., S. Gruenberg, J. Wegleitner, "Field Performance of Polymer Bridge Deck Overlays in Michigan," Michigan Department of Transportation, Jan. 2003, 43 pgs.

Castek, Technical Data Sheet, "Low Modulus Polysulfide Epoxy Overlay, T-48," Aug. 2004, www.transpo.com, pp. 1-3.

Chekan, John P., "An Investigation of the Force Required to Shear Snow from Various Aggregates Used in Road Construction and the Residual Effects of NaCl and CMA as a Deicing Agent," A Thesis submitted in partial fulfillment of the requirements for the degree of Master of Science in Civil Engineering, Michigan Technological University, 1990, 112 pgs. (no month).

Sikadur DOT-SPI "Epoxy Overlay Adhesive," Product Data Sheet, Edition Jun. 2003, pp. 1-2.

Sprinkel, M. "Twenty Five Year Experience With Polymer Concrete Overlays on Bridge Decks," Report submitted at the International Congress on Polymers in Concrete, Honolulu, May 21-24, 2001, pp. 1-6.

Sprinkel, M.M. et al., "Guide Specifications for Polymer Concrete Bridge Deck Overlays," AASHTO-AGC-ARTBA Task Force 34, Oct. 1995, pp. 1-63.

Tamms, "Flexolith Polymer Concrete Bridge Deck Overlay," www.tamms.com, pp. 1-2, Publication Date is Unknown.

Unitex Pro-Poly Type III D.O.T. "Low Modulus, Low Viscosity Epoxy Bonding Agent," www.unitex-chemicals.com, pp. 1-4, Publication Date is Unknown.

(56) References Cited

OTHER PUBLICATIONS www.slurry.com/cont_chipseal.shtml, "Pavement Maintenance Specialists, Contracting: Chip Seal," Feb. 1, 2006, 3 pgs.
www.transpo.com, "T-48 Thin Overlay System," pp. 1-2, Publication Date is Unknown.
European Patent Office Supplementary Search Report for Application No. 02802929.6 dated Sep. 6, 2010 (3 pages).
Japanese Patent Office Action for Application No. 2003-554812 (Appeal No. 2010-012238) dated Aug. 11, 2010 (3 pages).
Academic Press Dictionary of Science and Technology, Christopher Morris, editor, Academic Press, Inc. (1992) p. 292.
Friction, Wear, Lubrication: a Textbook in Tribology, Kenneth C. Ludema, editor, CRC Press (1996) Table 2.4; p. 27.
Industrial Minerals and Rocks, 6th Edition, Donald D. Carr, editor, Society for Mining, Metallurgy, and Exploration, Inc., Colorado (1994) p. 486.
Klyosov, A.A., Wood-Plastic Composites, Wiley-Interscience, Hoboken, New Jersey (2007) p. 146.
Polymer Technology Dictionary, Tony Whelan, editor, Chapman & Hall, New York (1994) p. 255.
Schumann, W., "Mohs' hardness," Minerals of the World, Sterling Publishing Co., Inc., New York (1992) 18-19.
Surface Mining, Bruce A. Kennedy, editor, Society for Mining, Metallurgy, and Exploration, Inc. (1990) p. 185.
European Patent Office Action for Application No. 02802929.6 dated Apr. 12, 2011 (6 pages).
Japanese Patent Office Action for Application No. 2003-554812 dated May 11, 2011 (17 pages) with English translation.

\* cited by examiner

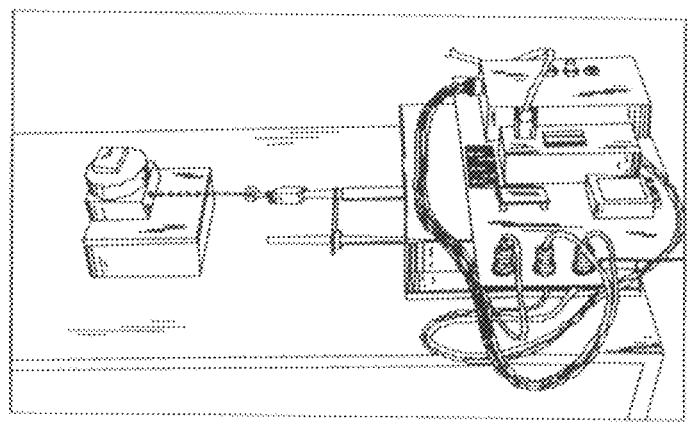
FIG. 5
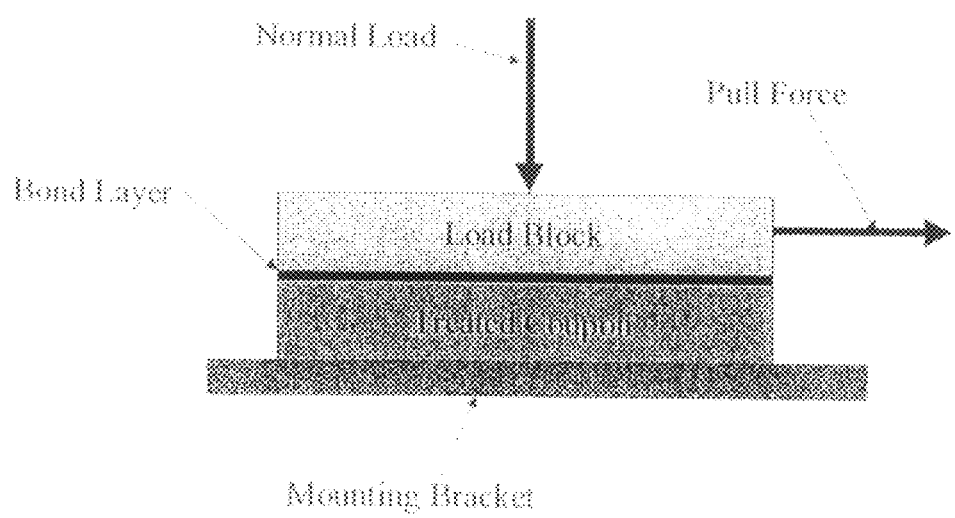
Figure 6. Load Block and Aggregate Sample.

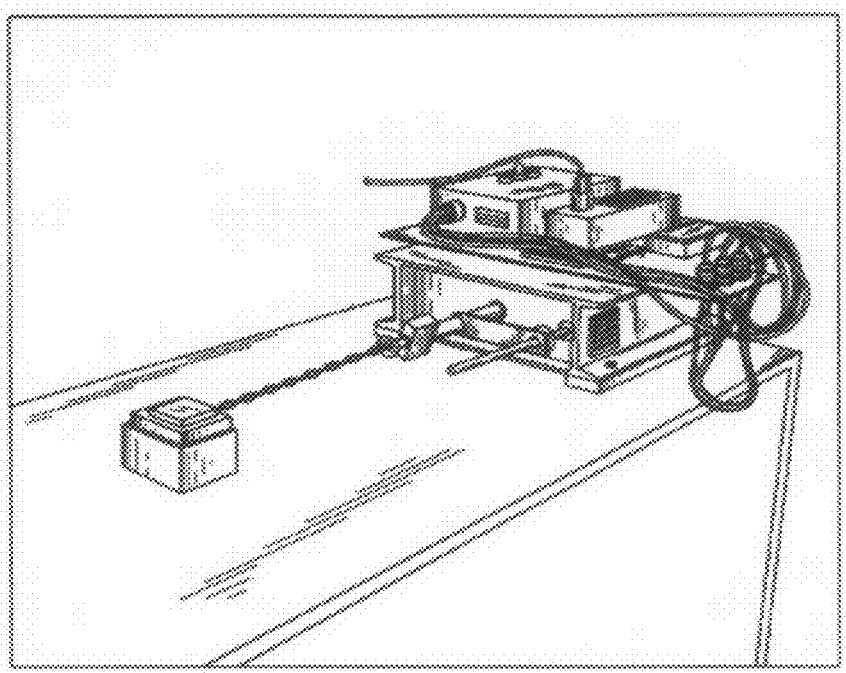
Figure 7
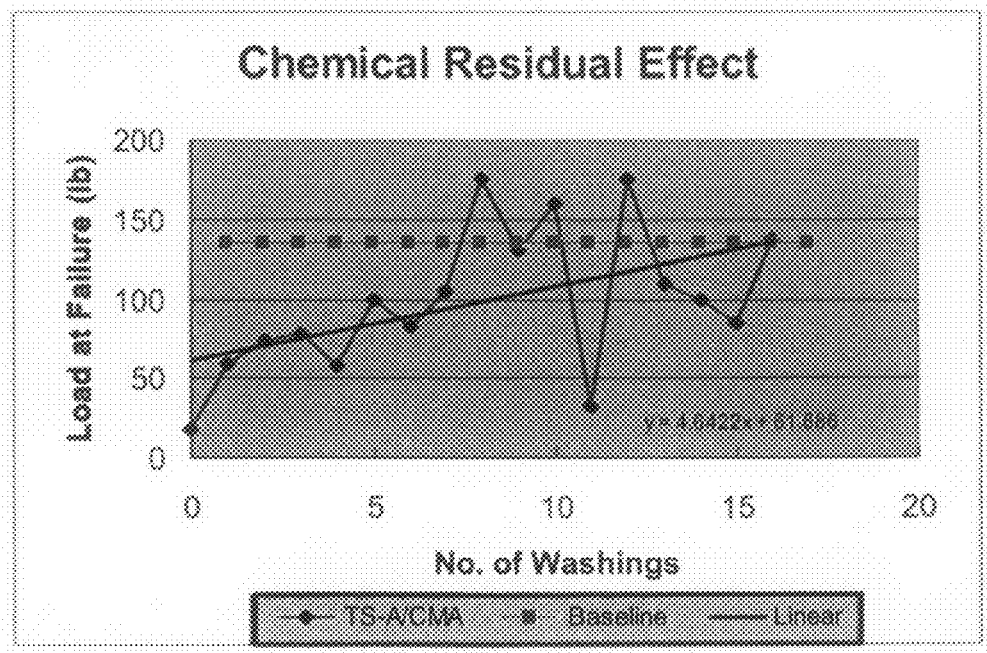
Figure 8. Bond Strength Reduction – TS-A/CMA.
Quarry Tile – Absorptivity = 0.27

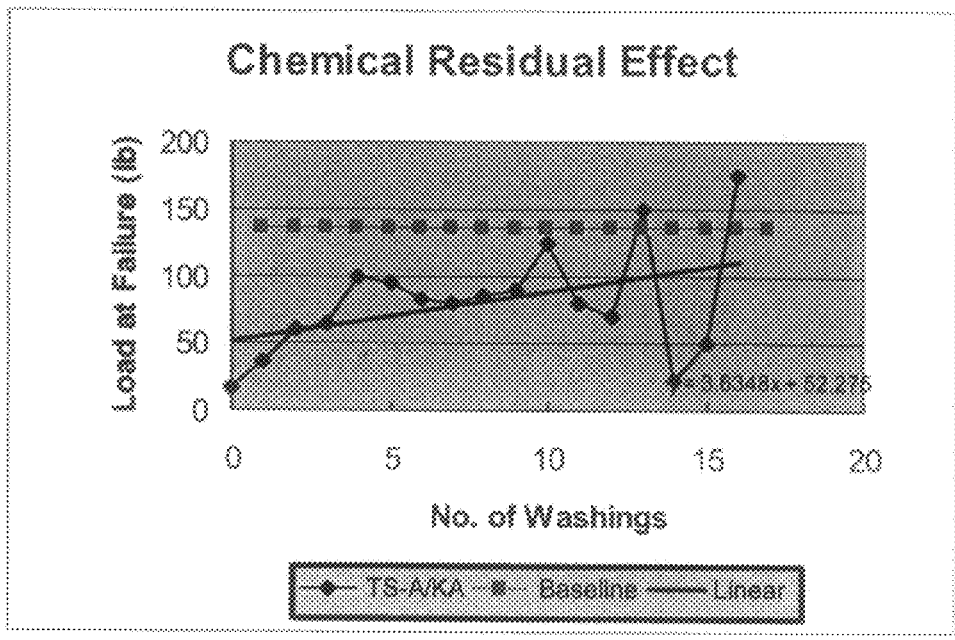
Figure 9. Bond Strength Reduction – TS-A/KA.
Quarry Tile - Absorptivity = 0.27
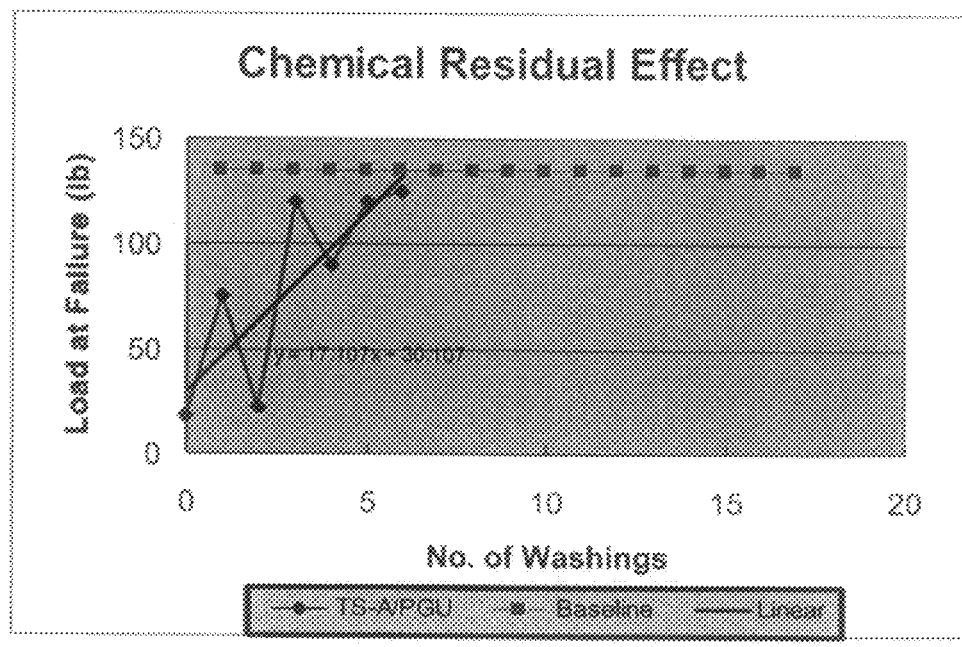
Figure 10. Bond Strength Reduction – TS-A/PGU.
Quarry Tile - Absorptivity = 0.27

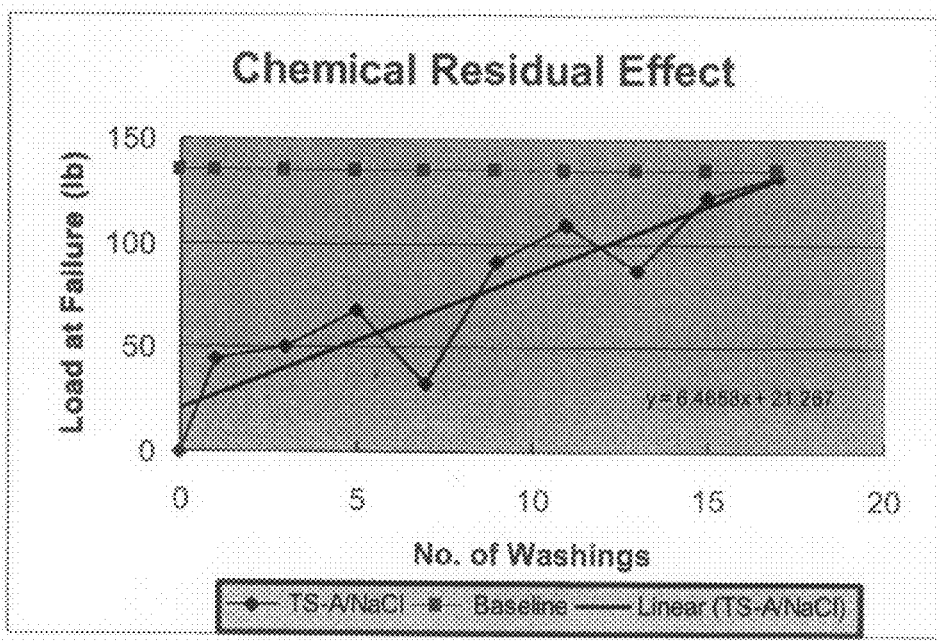
Figure 11. Bond Strength Reduction – TS-A/NaCl
Quarry Tile - Absorptivity = 0.27
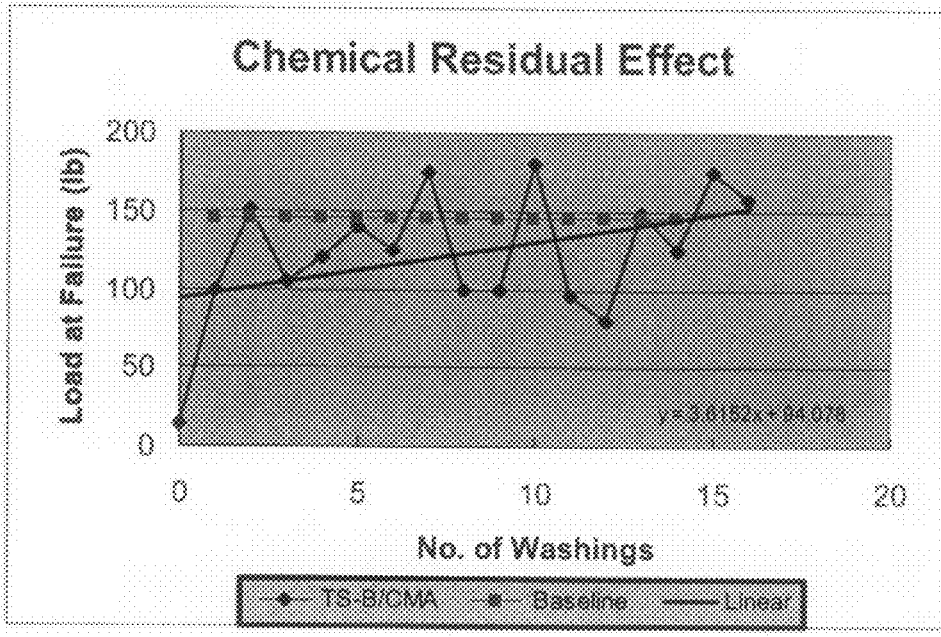
Figure 12. Bond Strength Reduction – TS-B/CMA.
Levy Co. Slag - Absorptivity = 5.49

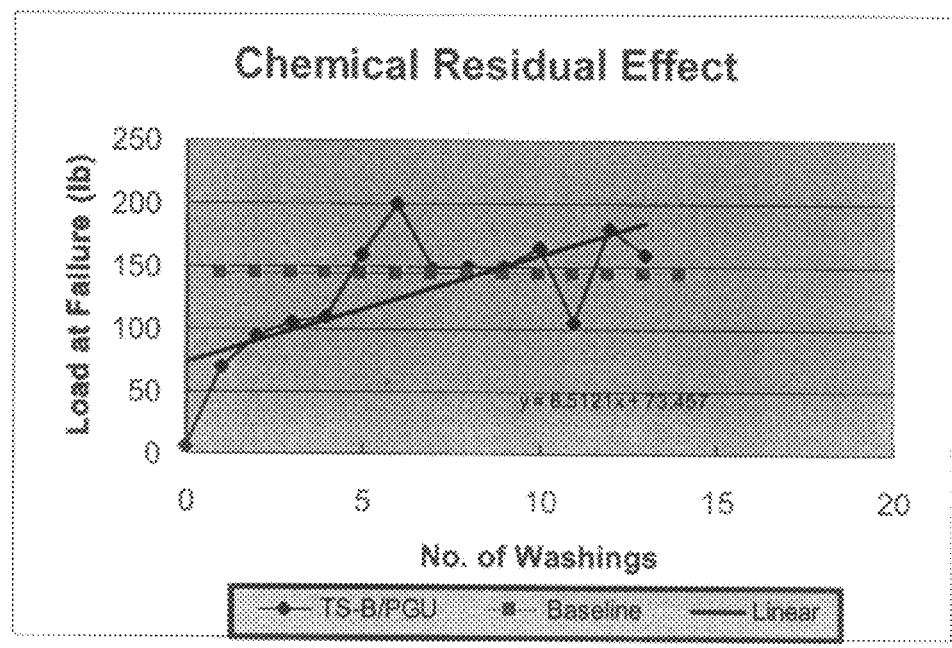
Figure 13. Bond Strength Reduction – TS-B/PGU
Levy Co. Slag - Absorptivity = 5.49
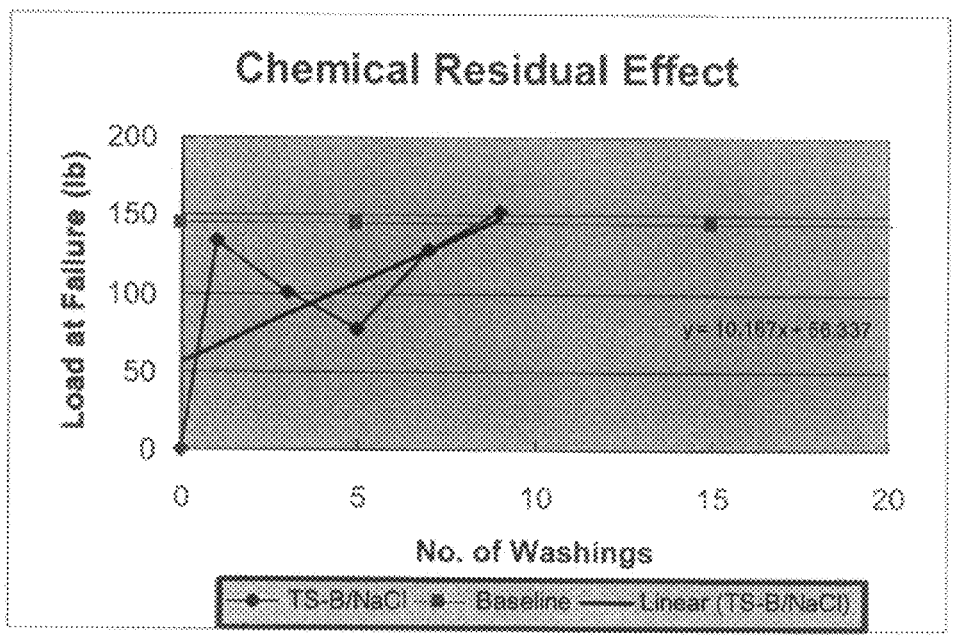
Figure 14. Bond Strength Reduction – TS-B/NaCl
Levy Co. Slag - Absorptivity = 5.49

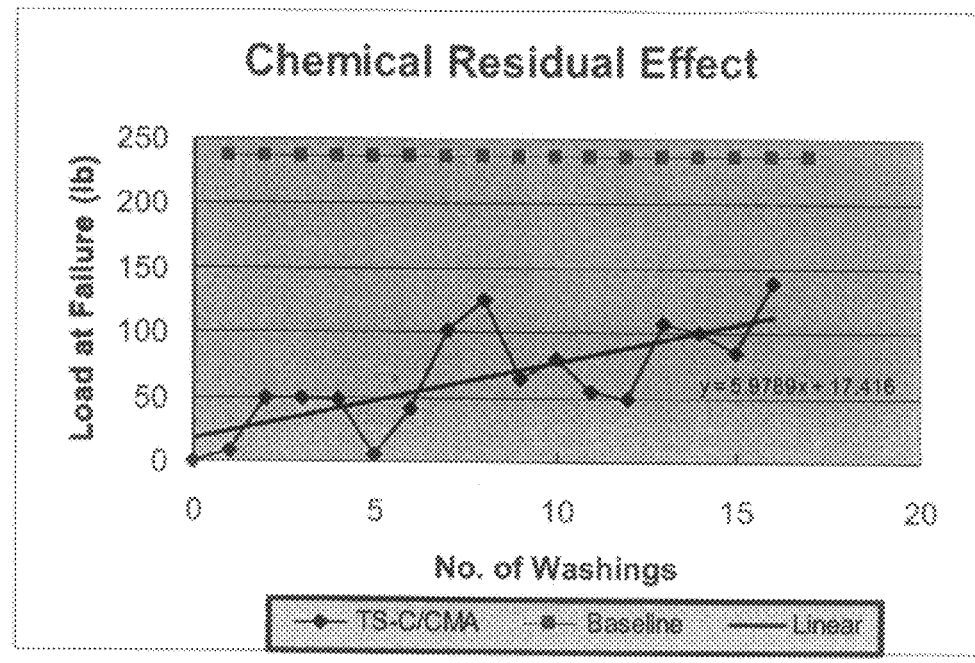
Figure 15. Bond Strength Reduction – TS-C/CMA.
London Aggregates Co. Limestone – Absorptivity = 4.42
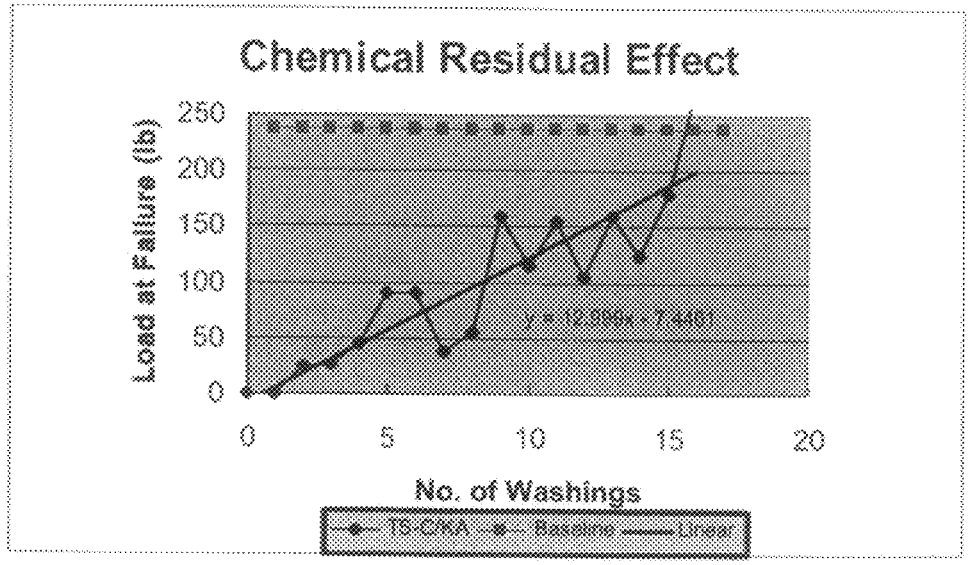
Figure 16. Bond Strength Reduction – TS-C/KA.
London Aggregates Co. Limestone – Absorptivity = 4.42

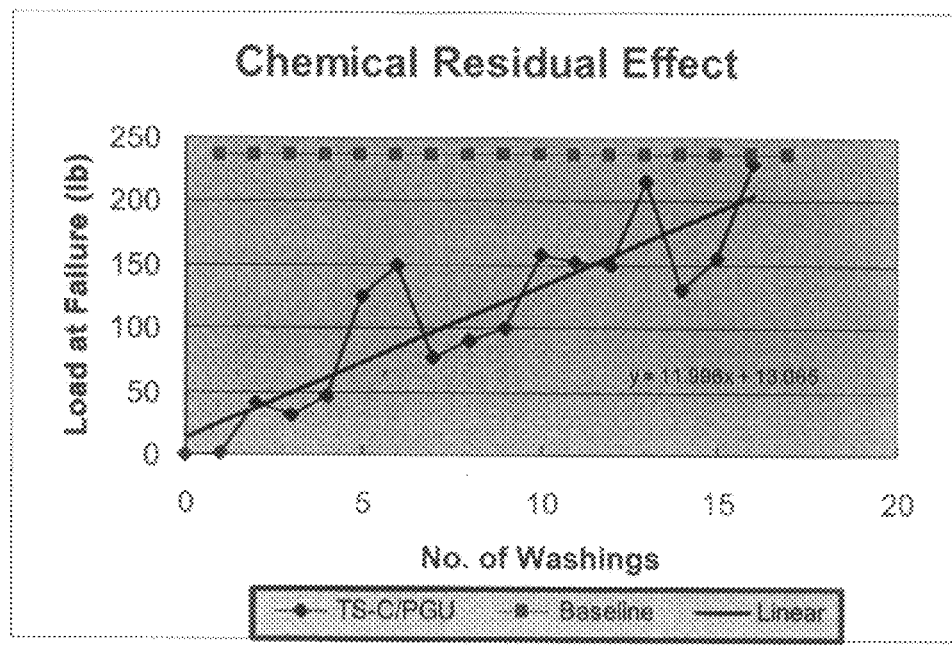
Figure 17. Bond Strength Reduction – TS-C/PGU.
London Aggregates Co. Limestone – Absorptivity = 4.42
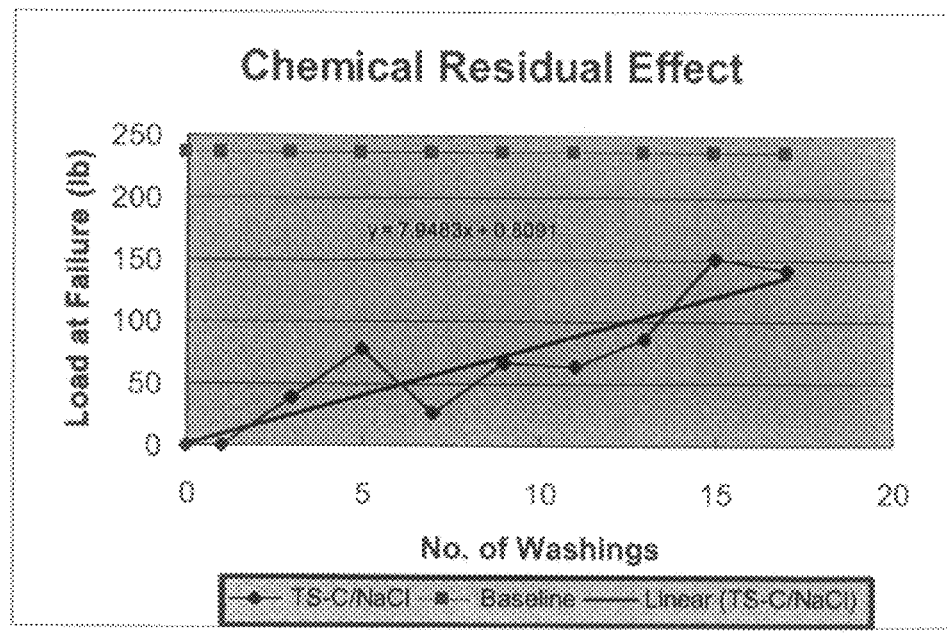
Figure 18. Bond Strength Reduction – TS-C/NaCl.
London Aggregates Co. Limestone – Absorptivity = 4.42

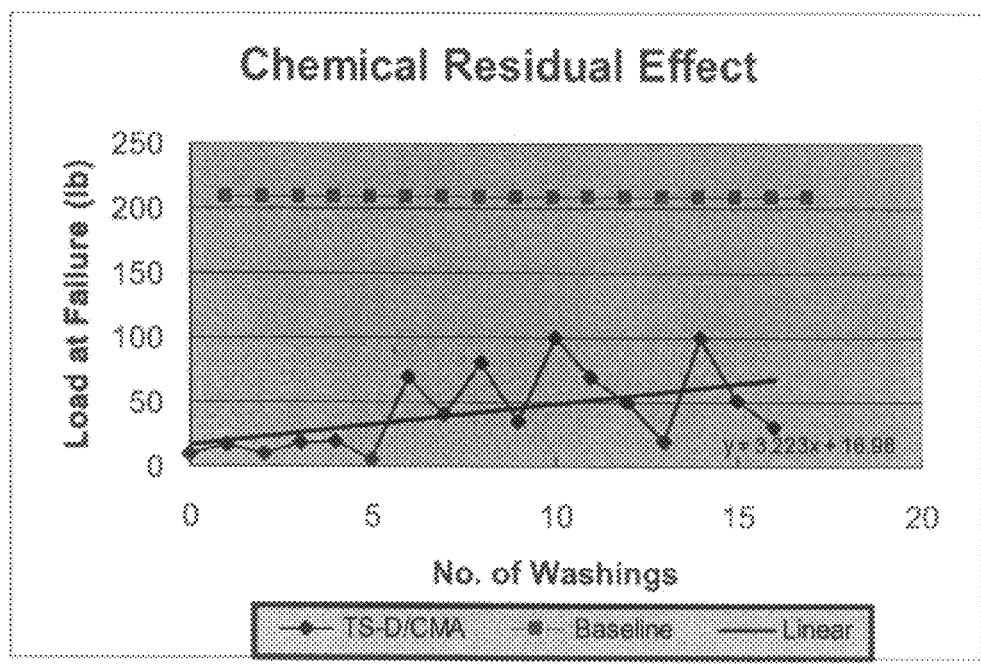
Figure 19. Bond Strength Reduction – TS-D/CMA.
Turunen, Inc. Limestone - Absorptivity = 1.73
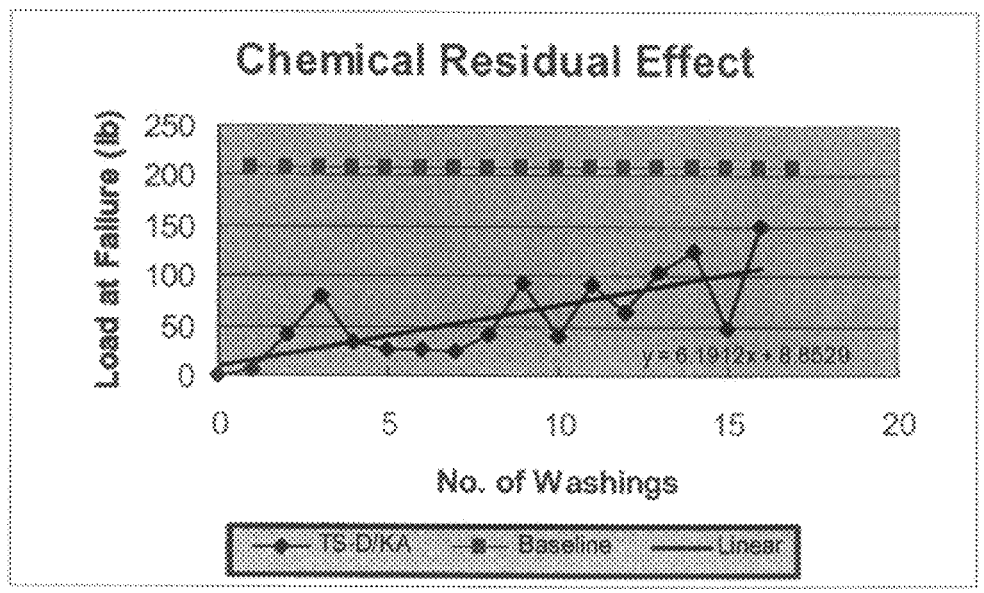
Figure 20. Bond Strength Reduction – TS-D/KA.
Turunen, Inc. Limestone - Absorptivity = 1.73

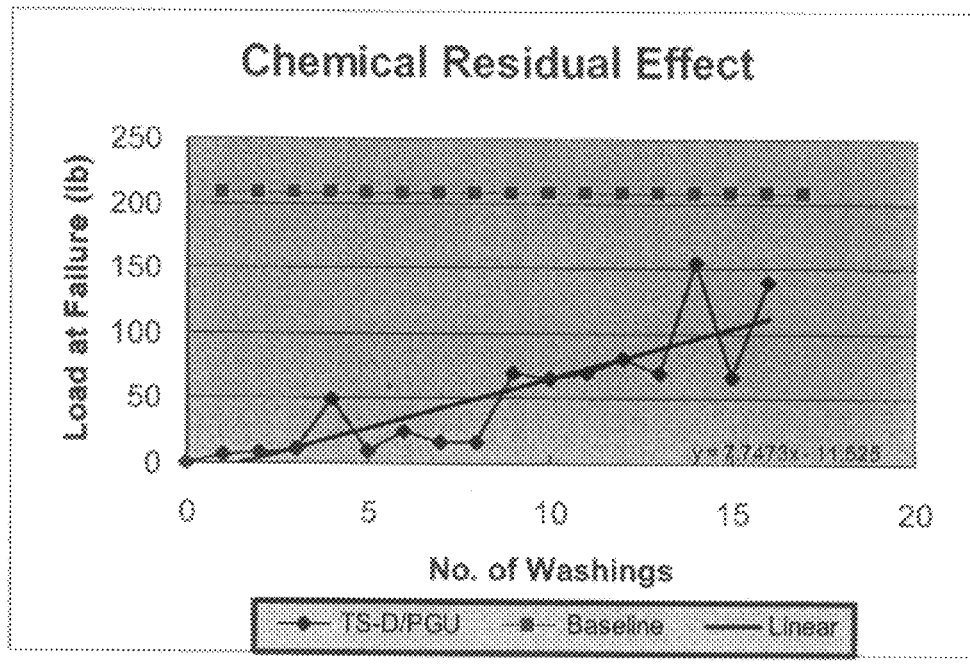
Figure 21. Bond Strength Reduction – TS-D/PGU.
Turunen, Inc. Limestone – Absorptivity = 1.73
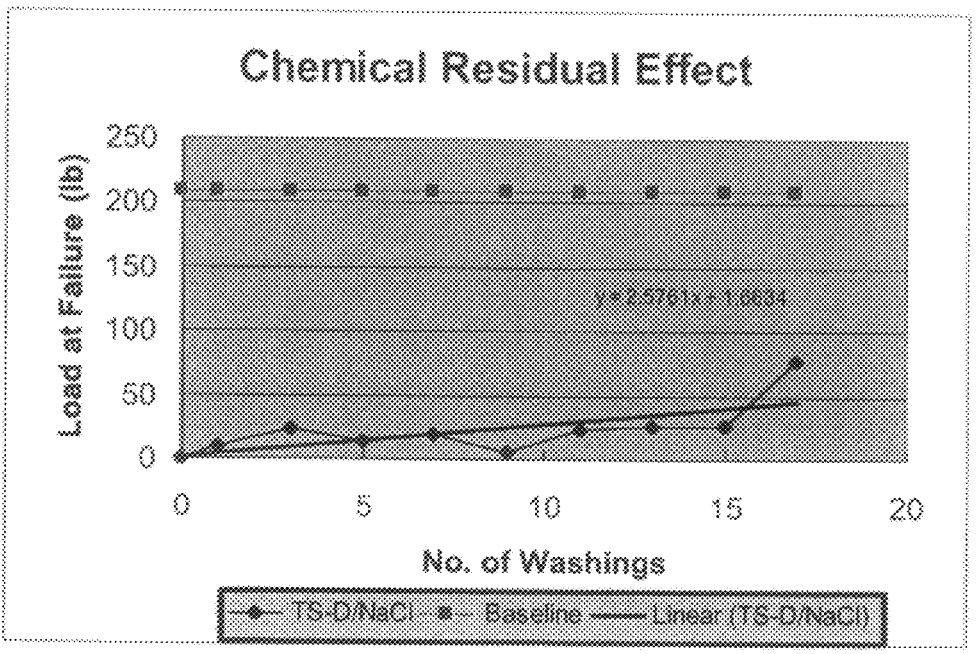
Figure 22. Bond Strength Reduction – TS-D/NaCl.
Turunen, Inc. Limestone – Absorptivity = 1.73

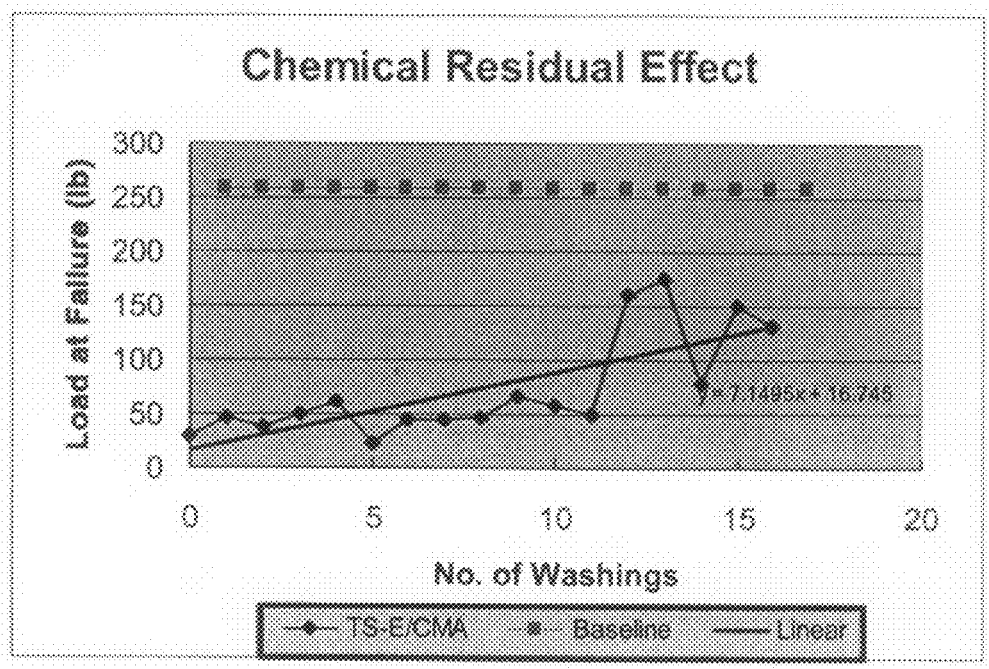
Figure 23. Bond Strength Reduction – TS-E/CMA.
Corps of Eng. Limestone - Absorptivity = 1.22
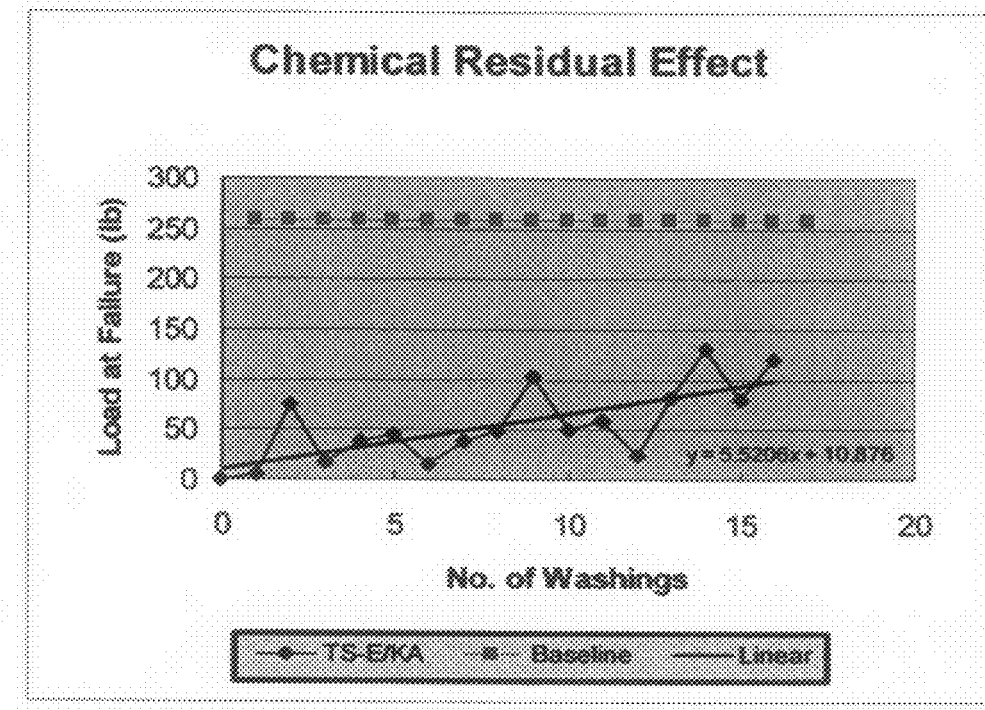
Figure 24. Bond Strength Reduction – TS-E/KA.
Corps of Eng. Limestone - Absorptivity = 1.22

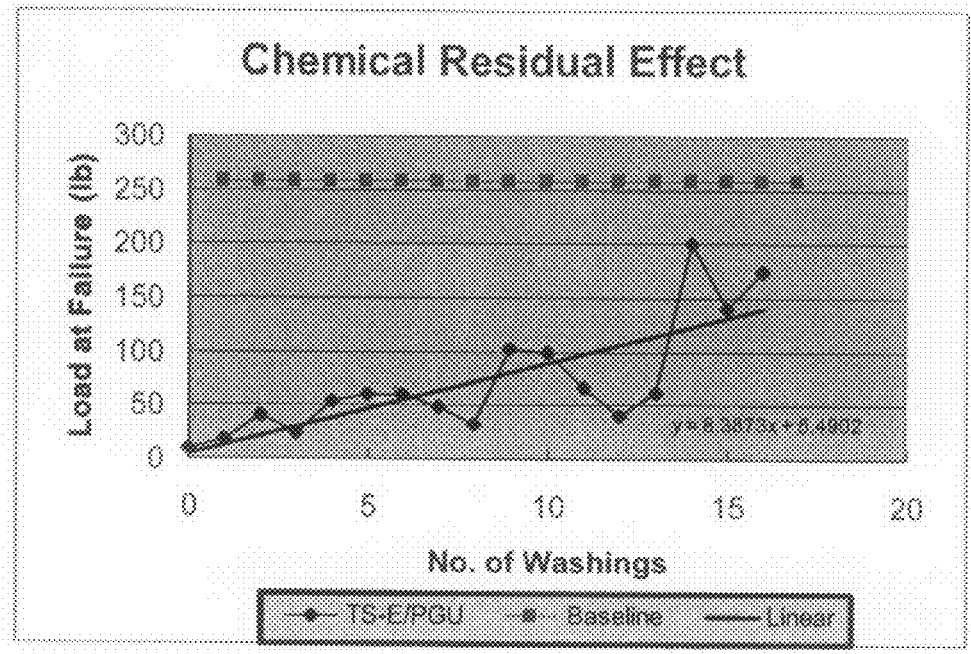
Figure 25. Bond Strength Reduction – TS-E/PGU,
Corps of Eng. Limestone - Absorptivity = 1.22
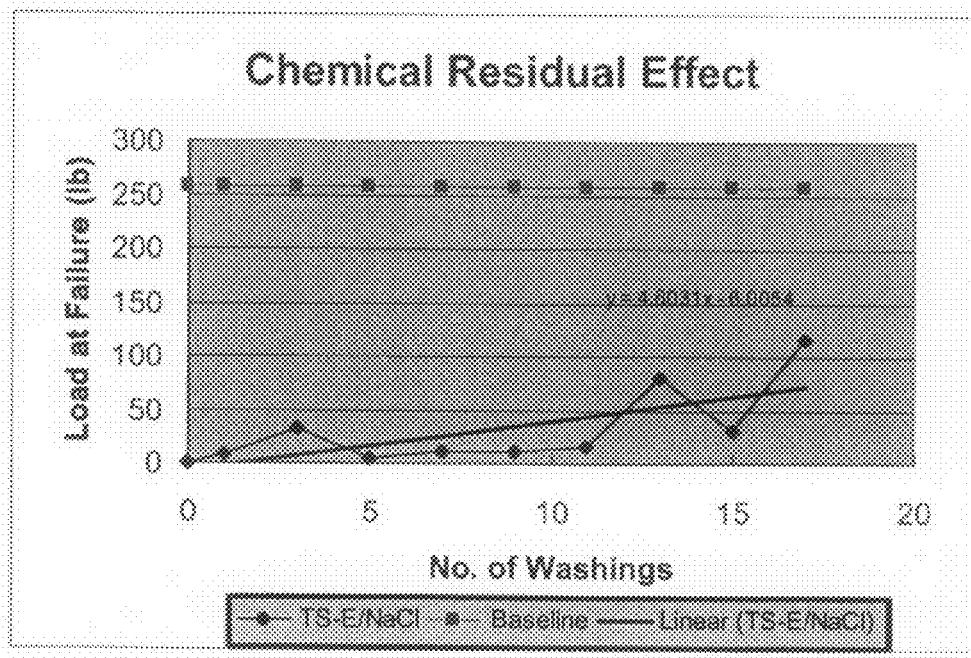
Figure 26. Bond Strength Reduction – TS-E/PGU,
Corps of Eng. Limestone - Absorptivity = 1.22

US 8,647,709 B2

ANTI-ICING COATINGS AND METHODS

CROSS-REFERENCE TO RELATED APPLICATIONS

This application is a continuation of and claims priority to U.S. patent application Ser. No. 11/026,442 filed on Dec. 30, 2004, now U.S. Pat. No. 7,279,197, which is a continuation of and claims poriority to U.S. application Ser. No. 10/267,943 filed Oct. 9, 2002, now U.S. Pat. No. 6,849,198, which claims priority under 35 U.S.C. §119(e) to U.S. Provisional Patent Application No. 60/327,877 filed on Oct. 9, 2001. Priority is claimed to each of these applications, and the subject matter of each of these applications is expressly incorporated herein.

BACKGROUND OF THE INVENTION

The use of freezing point depressants to remove hard-packed snow and ice from pavements has been a common practice by highway maintenance crews for decades. Each new freezing point depressant or chemical that is brought into the market has its own unique set of properties. Some of the depressants are thicker than others, while others are more concentrated. Others may have unpleasant odors, while others may work only at warm temperatures.

One of the first chemicals to be used by road maintenance crews was sodium chloride (NaCl), more commonly known as road salt. Initially, this chemical was applied as a solid, which rapidly went into solution in the presence of snow, ice or water. Typically, chemicals such as road salt have been applied during storms when temperatures were 20° F. or warmer in an attempt to melt snow as it fell and limit bonding to the pavement. Chemicals have also been applied after a storm to remove snow and ice that has bonded to the surface.

New methods of snow and ice removal are constantly being sought. More particularly, methods of snow and ice removal that do not adversely affect the environment and methods that decrease the volume of chemicals required are most sought.

SUMMARY OF THE INVENTION

In one aspect, the invention provides a method of inhibiting or preventing bonding between snow or ice and a substrate. The method includes applying an adhesive to the substrate, broadcasting an aggregate onto the adhesive to form an aggregate-adhesive, and applying an anti-icing chemical onto the aggregate-adhesive.

In another aspect, the invention provides an anti-icing composition. The composition includes an adhesive and an aggregate. At least a portion of the aggregate is encompassed by the adhesive and at least a portion of the aggregate is not encompassed by the adhesive and has a plurality of pores. The composition also includes an anti-icing chemical at least partially filling one of the pores.

In a further aspect, the invention provides another anti-icing composition. The composition includes an adhesive at least partially encompassing limestone having pores, and an anti-icing chemical at least partially filling at least one pore of the limestone.

BRIEF DESCRIPTION OF THE DRAWINGS

FIG. 5 is a perspective view of a bond strength measurement device.
FIG. 6 is a diagram depicting load block and aggregate sample.
FIG. 7 is a perspective view of a sample mounted in a measurement device.
FIG. 8 is a graph depicting bond strength reduction for quarry tile aggregate (TS-A) with calcium magnesium acetate (CMA) applied thereto.
FIG. 9 is a graph depicting bond strength reduction for quarry tile aggregate (TS-A) with potassium acetate (KA) applied thereto.
FIG. 10 is a graph depicting bond strength reduction for quarry tile aggregate (TS-A) with propylene glycol (PGU) applied thereto.
FIG. 11 is a graph depicting bond strength reduction for quarry tile aggregate (TS-A) with sodium chloride (NaCl) applied thereto.
FIG. 12 is a graph depicting bond strength reduction for Levy Co. Slag aggregate (TS-B) with calcium magnesium acetate (CMA) applied thereto.
FIG. 13 is a graph depicting bond strength reduction for Levy Co. Slag aggregate (TS-B) aggregate with propylene glycol (PGU) applied thereto.
FIG. 14 is a graph depicting bond strength reduction for Levy Co. Slag aggregate (TS-B) aggregate with sodium chloride (NaCl) applied thereto.
FIG. 15 is a graph depicting bond strength reduction for London Co. limestone aggregate (TS-C) aggregate with calcium magnesium acetate (CMA) applied thereto.
FIG. 16 is a graph depicting bond strength reduction for London Co. limestone aggregate (TS-C) with potassium acetate (KA) applied thereto.
FIG. 17 is a graph depicting bond strength reduction for London Co. limestone aggregate (TS-C) with propylene glycol (PGU) applied thereto.
FIG. 18 is a graph depicting bond strength reduction for London Co. limestone aggregate (TS-C) with sodium chloride (NaCl) applied thereto.
FIG. 19 is a graph depicting bond strength reduction for Turunen, Inc. limestone aggregate (TS-D) with calcium magnesium acetate (CMA) applied thereto.
FIG. 20 is a graph depicting bond strength reduction for Turunen, Inc. limestone aggregate (TS-D) with potassium acetate (KA) applied thereto.
FIG. 21 is a graph depicting bond strength reduction for Turunen, Inc. limestone aggregate (TS-D) with propylene glycol (PGU) applied thereto.
FIG. 22 is a graph depicting bond strength reduction for Turunen, Inc. limestone aggregate (TS-D) with sodium chloride (NaCl) applied thereto.
FIG. 23 is a graph depicting bond strength reduction for Corps of Eng. limestone (TS-E) with calcium magnesium acetate (CMA) applied thereto.
FIG. 24 is a graph depicting bond strength reduction for Corps of Eng. limestone (TS-E) with potassium acetate (KA) applied thereto.
FIG. 25 is a graph depicting bond strength reduction for Corps of Eng. limestone (TS-E) with propylene glycol (PGU) applied thereto.
FIG. 26 is a graph depicting bond strength reduction for Corps of Eng. limestone (TS-E) with propylene glycol (PGU) applied thereto.

Figure 1:
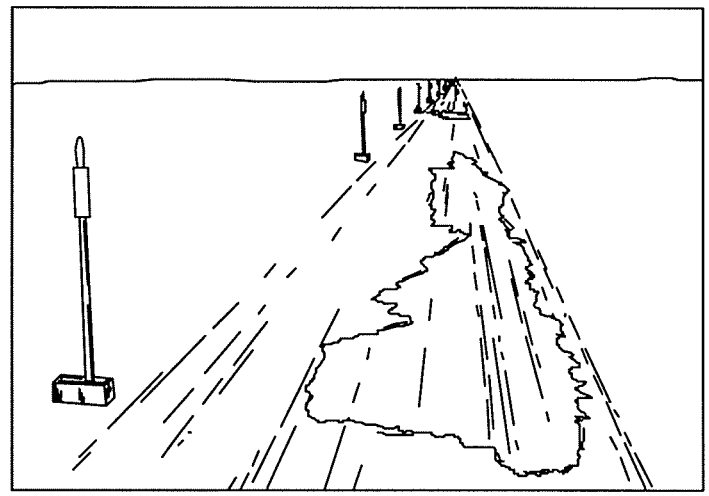
FIG. 1 is a perspective view of a melted area of a road having an embodiment of the invention applied thereto.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION OF THE INVENTION

Within the last ten years, environmental concerns have dictated the search for new chemicals as well as methods to decrease the amount of chemical used in snow and ice removal and prevention. One way to decrease the volume of chemicals is to limit the amount of hard-pack snow that needs to be removed from the surface after a storm. The invention includes a new method of pavement deicing that reduces bonding of snow and ice to the pavement. The refined concept is known as "anti-icing".

In its simplest form, anti-icing comprises the application of chemicals prior to a predicted storm in an attempt to limit bonding to the pavement surface. In a low-precipitation-volume storm, the chemical has the potential to melt all frozen precipitation as it hits the surface. Generally speaking, the amount of chemicals required to inhibit and prevent bonding of snow and ice to the road is less than the amount required to melt snow and ice that has already bonded to the road. In heavier storms, the chemical keeps bonding to a minimum and allows for easy mechanical removal. In the event of predicted freezing rain events and frost events, chemicals that are applied prior to the storm have a marked effect on keeping the pavement from getting slippery due to ice.

In a preferred embodiment of the anti-icing methods, an adhesive is applied to pavement on a road, bridge, airport runway, tarmac or any other surface on which a vehicle may travel which may be covered by ice or snow. The adhesive acts to seal the pavement, thereby keeping water and salt from seeping through cracks or voids in the road. The adhesive also provides a slick, slippery overlay coating. Another goal of applying the adhesive is to repair delaminations, potholes and cracks. In addition, the surface may also be cleaned by shot-blasting the pavement in order to remove any remaining contaminants, or by using oil-free compressed air to blow off and remove remaining dust and debris. The adhesive may be applied by using a notched squeegee at pre-specified rates. Additionally, the adhesive may be applied by using a brush or a sprayer. Any conventional adhesive application may be used. A wide variety of adhesives are suitable for use with the invention. The most preferred types of adhesives include epoxies, styrenes, methyl-methacrylate, as well as tar. One example of an epoxy follows, although this particular epoxy should in no way be construed as being limiting in terms of the types of epoxies that may be used. It is important, however, that the adhesive does not fill up or block the voids and pores of the aggregates discussed below so that no available space exists for the chemicals to fill. Typically, the thickness of the adhesive on the substrate is about ⅛".

One preferred epoxy is PRO-POXY TYPE III D.O.T., which is a solvent-free, moisture insensitive, 100% solids, low modulus, two component bonding agent distributed by Unitex, Kansas City, Mo. PRO-POXY TYPE III D.O.T. meets ASTM-C-881 Type III, Grade 1, Classes B & C. The properties of this particular resin follow.

TABLE 1

| LABORATORY TESTS | RESULTS | ASTM C-881 SPECIFICATIONS |
|---|---|---|
| RESIN PROPERTIES | | |
| Mix Ratio | 1:1 by volume | None |
| D-695 Compressive Modulus | 64,820 | 130,000 maximum |
| D-638 Tensile Strength | 2,610 psi | None |
| D-638 Tensile Elongation | 49% | 30% minimum |
| C-882 Bond Strength (14 day cure) | 3,470 psi | 1,500 psi minimum |
| D-570 Absorption | 0.19% | 1.0% maximum |
| C-881 Gel Time | 30 minutes[1] | 30 minutes maximum |
| C-881 Brookfield Visc. RV3 @20 rpm | 1425 cps | 2000 cps maximum |
| D-2240 Shore D Hardness | 69 | None |
| C-883 Shrinkage | Pass | None |
| C-884 Thermal Compatibility | Pass | None |
| AASHTO T-277 Chloride Ion Permeability | 0.9 coulombs | None |
| Grout Properties Sand to Resin 3.5:1 by volume | | |
| C-579[2] Compress. Strength 3 hrs | 1100 psi | N/A |
| C-579[2] Compress. Strength 24 hrs | 7500 psi | N/A |
| C-579[2] Compressive Strength 48 hrs$^{moist\ cure}$ | 7500 psi | N/A |

Subsequently, in a preferred embodiment, aggregate is broadcast onto the adhesive. As used herein, the term "broadcast" is meant to refer to sprinkling, dropping, or spraying dry aggregate over the wet epoxy. The aggregate may be angular, grained silica sand, basalt having less than 0.2% moisture, flint, chipped limestone or dolomite, free dirt, clay, etc. The silica sand or basalt may have a minimum MOHS scale hardness of 7 unless otherwise approved. Typically, the aggregate is about ⅛ inch to ¼ inch, although aggregate sized from 1/16 inch to ½ inch may be used. The thickness of the aggregate or the substrate is generally about ¼ inch to ¾ inch. Once the aggregate is glued to the surface using the adhesive, the aggregate may be ground. For example, the aggregate may be ground to about ¼ inch to about ⅜ inch. More particularly, once the adhesive has set, a surface grinder may be employed to cut off portions of the jagged surface. The resultant surface looks a lot like a light colored pavement, although it is rougher. This process makes the surface very much like a solid limestone or dolomite slab with enough texture to keep good surface friction.

Overall, the most preferred type of aggregate, however, is limestone or dolomite. The type of limestone or dolomite used in conjunction with the invention may be dictated by regional availability. Some examples of limestone and dolomite include three aggregates chosen from the approved source list at the Michigan Department of Transportation (MDOT). For example, MDOT Pit #92-11 (dolomitic limestone), London Aggregates Co. and MDOT Pit #58-10 (air cooled blast furnace slag), E.C. Levy Co. can all be used in conjunction with the invention. Each of these limestones exhibits a high absorptivity. Other examples include limestones originating from a quarry operated by Turunen, Inc. in Pelkie, Mich., and another of unknown origin obtained from a Corps of Engineers armor stone pile on the Hancock Canal in Hancock, Mich.

After initially curing the first application of aggregate on the adhesive, excess aggregate may be removed from the surface. Shortly thereafter, a second course of adhesive and aggregate may be applied to the portion of the road or bridge, and excess aggregate may again be removed and the second course allowed to cure. Typically, each adhesive layer is about ¼ inch thick, although it may be as thin as ⅛ inch and as thick as ¾ inch. The second application of adhesive and aggregate is not required. At least a portion of the aggregate is generally encompassed by the adhesive in order for the aggregate to be secured to the surface or substrate. At least a portion of the aggregate may not be encompassed, i.e. it is exposed to ambient conditions, so that pores in the aggregate may be at least partially filled with an anti-icing chemical.

Once the aggregate and adhesive have cured, an anti-icing chemical, or a combination of anti-icing chemicals, is applied to the aggregate-adhesive. Generally, the application is accomplished by spraying the chemicals onto the aggregate-adhesive, although brush application as well as other known application techniques may be used. In other words, any method that enables chemicals to be applied to stretches of road or bridges is acceptable. Preferably, the anti-icing chemicals are applied in liquid form, although solid, powder and gaseous chemicals may be used. Any anti-icing chemical that acts as a freezing point depressant or lowers the freezing point of the ice and snow may be used with the invention. Preferred anti-icing chemicals include calcium magnesium acetate, potassium acetate, sodium acetate, sodium chloride, sodium formate, magnesium chloride, propylene glycol with urea additive, ethylene glycol with urea additive and potassium carbonate.

Some of the freezing point depressants tend to display a residual effect when used in conjunction with the aggregates described above. In other words, residual effect may be exhibited through a storm as the chemicals prevent bonding between the snow/ice and the pavement, and subsequently functions in a similar manner during the next storm. Residual effect is a characteristic of a chemical that allows it to function for an extended period of time during a single storm event, while also maintaining the potential to remain on the pavement in order to function in the event of subsequent storms.

In simple terms, residual effect means the invention is able to function again and again without the need for chemical reapplication. Certain combinations of chemicals and aggregates have the potential to greatly increase residual effect at the pavement surface. Some chemicals exhibit a better tendency for residual effect than others. FIG. 1 shows residual effect of a chemical on a pavement test section. In some cases, chemicals may be resistant to washing by storm and melt water, as well as the mixing action of traffic tires. This can contribute to increased residual effect.

When limestone is utilized as an aggregate, it tends to create a sponge-like pavement to which the anti-icing chemicals can be applied. Although the invention should in no way be limited by theory, it is believed, in part, that the limestone's porosity and ability to absorb imparts a residual effect. In any event, the combination of a limestone aggregate and an anti-icing chemical seems to greatly enhance the residual effect. In other words, some property of the limestone allows the anti-icing chemical to be absorbed into the limestone, but not too far from the surface of the limestone. As a result, new chemicals do not need to be applied to the limestone after every storm or event. Instead, the limestone aggregate and anti-icing chemical combination remains effective from storm after storm. It has also been found that by cleaning the surface of the aggregate/adhesive/chemical on the pavement, e.g. by a strong, intense water stream, the residual effect is further enhanced. In other words, this cleaning seems to "recharge" the surface after the surface has been exposed to a storm. The residual effect provides a semi-permanent anti-icing method that makes it unnecessary to reapply the anti-icing chemicals after each storm. Instead the chemicals can be sprayed, e.g. in October, before the winter season, and need not to be reapplied until after the storm season or later.

The chemicals tend to stay on or close to the area on which they are intended to be applied. As a result, these chemicals are less detrimental (if at all) to the environment. In addition, these chemicals are not wasted on the shoulder or ditch, which is often the case when pellets of sodium chloride are dropped on the road. In the case of bridges over fragile streams, chemical runoff into fragile streams is almost nonexistent. The sponge-like action of the overlay holds the chemical in place and prevents it from being blown off by passing vehicle traffic, aircraft jet blast or propeller wash.

The overlay is rough in its applied state and eliminates the need to consider whether the surface is wet, because the particle roughness alleviates wetness. The overlay also eliminates stalled or backed-up traffic leading into airports, which is caused by airports having seemingly wet pavement surfaces. In addition, the anti-icing overlay system is rougher and has a higher overall friction value than either Portland cement or asphalt cement pavements. This roughness makes the traction, steering, and braking of rubber tires safer. It also prevents water or chemicals from infiltrating the pavement, reaching reinforcing steel and causing corrosive damage. This will prolong the life of concrete pavement, i.e. bridges, roads and runways.

A single application of liquid chemical can remain effective on the overlay for extended periods of time (e.g. as long as months) in the case of frost and freezing rain events. The overlay is applied on the surface of the existing pavement and will last five or more years before needing to be touched up. Chemicals can be re-applied whenever they are needed. Overall, by reducing the bond and bond strength between the snow and ice and the substance upon which automobiles and other vehicles travel, the chance of accidents occurring is reduced.

EXAMPLES

Example 1

Frost Growth and Ice Bond Mitigation

"Frost growth" and "ice bond mitigation" were performed to test anti-icing and residual effect. The test procedures for these follow.

In preparation for both the frost and bonding tests, aggregate samples were cut using water lubricated saws to avoid introducing any oils or other chemicals contacting the samples. A large cutoff saw was used for initial cutting and a smaller tile saw for the finish cuts.

A method was also devised to simulate the effect of water and tire action at the surface of a pavement, thereby determining how well a combination reacted to a storm event, and the potential for it to keep working through future storms. After the load simulation was completed the aggregates were left to thaw at room temperature. Once all ice was melted from the surface of the aggregates, a saturated sponge was used to wipe them clean. The sponge was passed over the aggregate surface five times. This procedure was meant to simulate the washing of the road surface by traffic and one storm event. After this process was completed the aggregates were left to air dry at room temperature until no visible signs of moisture remained on the blocks.

Frost Growth

To determine how well a chemical/aggregate combination could mitigate the formation of frost on the pavement surface, the phenomena that causes frost to grow was simulated. Frost forms on the pavement when a relatively warm, wet, air mass passes over a cold pavement section. The air mass must be adequately warm in order to contain water vapor that is unfrozen. The pavement must be cold enough to contribute to condensation and freezing of this liquid vapor. The two most common cold pavement scenarios are bridge decks cooled from beneath by the air and pavements where the base material is much colder than the air, which allows it to remain cold even if the air above it is warmer.

Figure 2:
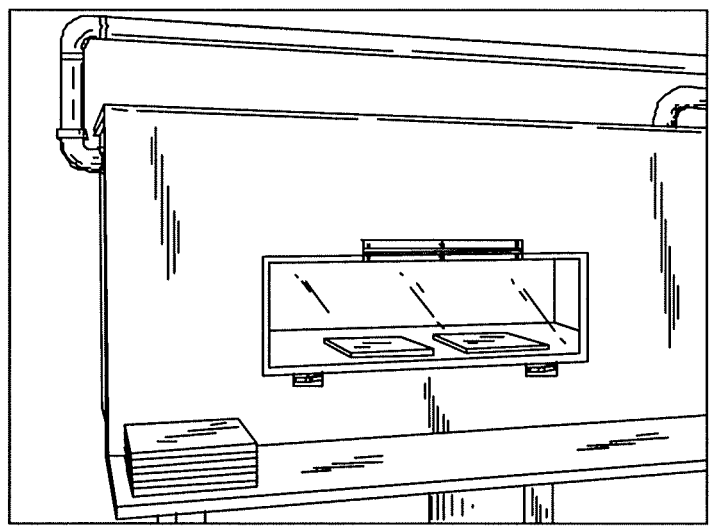
FIG. 2 is a perspective view of a frost growth chamber.

A frost growth chamber or control box was designed and built inside the KRC (Keweenaw Research Center) cold laboratory to simulate the frost growth phenomena and is shown in FIG. 2. This box is approximately 4 feet long by 2 feet wide by 2 feet high. The interior of the box is insulated except on the bottom, which comprises a ½ inch thick aluminum plate. A light bulb and dimmer switch setup are used to heat the inside of the box to create a temperature gradient between the outside and inside of the box. With this setup, the coldroom can be set at 20° F., and the inside of the box can be kept at, for instance, 34° F. The insulated walls of the box work well to keep the inside air temperature constant while at the same time the high thermal conductivity of the aluminum plate on the bottom keeps that surface at a temperature much lower than the inside air. With this sort of temperature difference from the outside to the inside of the test box, thin pavement (or aggregate) samples can be placed on the aluminum inside the box, and their surface temperatures cooled well below the air temperature. The box is also equipped with a glass viewing door and internal thermocouples for various temperature measurements.

Figure 3:
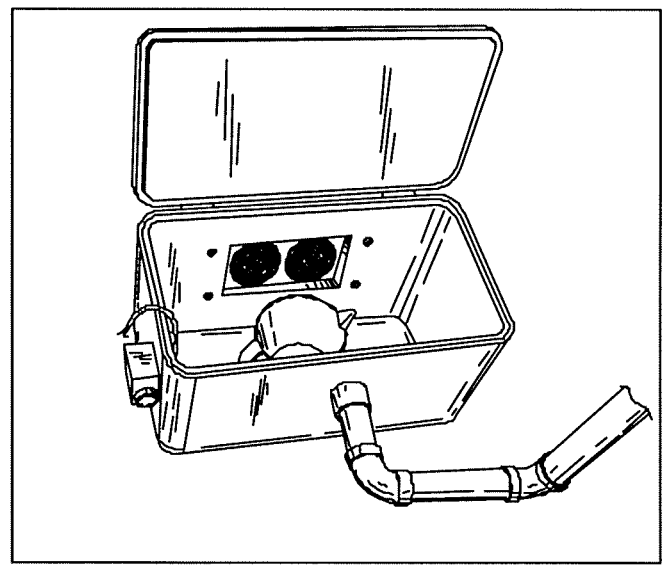
FIG. 3 is a perspective view of a moisture generator.

Once the method for simulating "warm" air on top of cold pavement was completed, a moist air on top of the samples was induced. Since it is known that the most severe frost growth occurrences are when a moist warm air mass flows very slowly (nearly calm conditions) over a cold substrate, this was the starting point for this part of the setup. Several different methods to produce frost within the test box were tested. The final setup was a network of 2 inch PVC pipe that is plumbed into the coldroom through the wall from the outside office. FIG. 3 shows the moisture generator or air system. A pipe is inserted through the wall and into one end of the frost box and a second pipe exits the other end of the box and back through the coldroom wall. FIG. 2 shows these pipes. Outside of the coldroom (in the office) is a large insulated cooler into which one of the PVC pipes is plumbed. A variable output fan mounted inside this box can be used to force air through the pipe. Exhaust air moves back through the other pipe into the office. Also located inside this box is a heated water reservoir that can be used to increase the amount of moisture flowing through the system.

Figure 4:
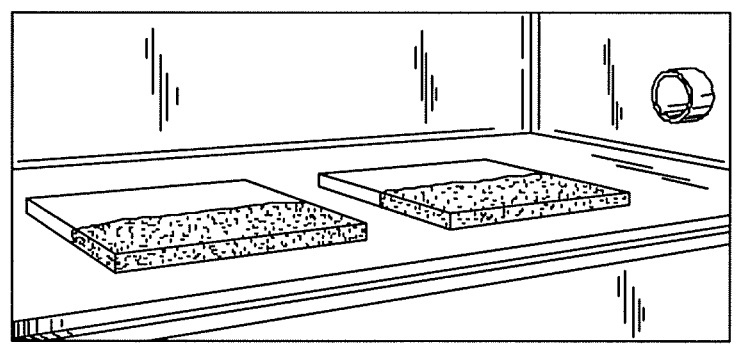
FIG. 4 is perspective view of a frost growth on test samples.

A frost growth test was performed by setting the coldroom temperature to a desired value and also setting the temperature in the frost box to allow freezing from the bottom of a sample. Test samples are placed into the box and left there in an adjusted moisture regime. After a period of time, the samples are evaluated visually for frost growth. In general, the frost is quite obvious if it has formed to any degree. Attempts were made to quantify the existence of frost, but since the frost is highly fragile, it is not possible to measure it. FIG. 4 shows two tile samples inside the box. Each tile has chemical applied over one-half of the surface. In this case, the chemical is on the sides in the background. Each tile is frost covered in the foreground half (no chemical) and frost free in the background (chemical applied).

Bond Growth

FIG. 5 shows a bond strength measurement device. The assessment of bond strength reduction at the pavement interface was studied using a shear test in the cold lab. A device comprising a horizontal load cylinder with a load cell and distance/speed measurement sensors was set up in the KRC lab. This device was connected to a computer data acquisition system that collects and stores load and displacement throughout a test. The load cell used for these tests has a maximum range of 400 pounds and measures to a precision of approximately ±0.2 pounds. The distance measurement device measures to approximately ±0.0075 inches. Tests were performed at a speed of 0.0015 inches per second. A sample is mounted into this device and the resultant bond strength can be measured.

Ice was used instead of snow particles, since the two are essentially the same at high density. In order to get repeatable results in the lab many different scenarios were tried with the final sample setup as follows.

For example, aggregate samples of approximately ½ inches in thickness and 2 inches by 2 inches in plan were prepared. Wooden load blocks that are slightly larger than the stone coupons were set up with a small dam around the perimeter on one face. These dams are about ⅛ inches in height. The blocks can be set on a level surface, and the dam can be filled with water and frozen. This results in a ⅛ inch thick layer of ice on one face of the wooden block.

FIG. 6 shows a drawing of a load block system and FIG. 7 shows a sample mounted for testing. The water and block are left in the coldroom for two hours, at 25° F., or until the water has completely frozen. Once ice has fully formed, water is boiled in a separate container and an aluminum plate is placed in the boiled water. The water, aluminum plate, and aggregate samples are then brought into the coldroom with the ice samples. The hot aluminum plate is placed on the ice block for approximately fifteen seconds, or until a layer of water has formed. Once this has happened, the aggregates, which are still approximately room temperature (70° F.), are then placed on the water/ice sample. (Placing the block on the sample when its temperature is warmer than freezing aids in the bonding of the ice and aggregate.) The new combination is then left in the coldroom for approximately 30-45 minutes, or until the water has completely frozen. Once the water has completely frozen a hot soldering iron is used to melt away any excess ice that has formed around the aggregate beyond the surface plane. The sample is then mounted in a load simulator, which is connected to a data-logger. The load block and aggregate sample are locked into the device to assure a level pull. A load is applied to the sample at a rate of approximately 250 pounds per second, and is recorded by the data-logger by means of a load cell. The test data is then downloaded from the data-logger into a spreadsheet where the numbers can be manipulated to give a readable output. For these tests, the normal load is zero.

Results

Three aggregates were used from the approved sources list at the Michigan Department of Transportation (MDOT). Two samples were obtained from MDOT Pit #92-11 (dolomitic limestone), London Aggregates Co. and MDOT Pit #58-10 (air cooled blast furnace slag), E.C. Levy Co. Each of these exhibits a high absorptivity. Two other samples were obtained by KRC. Both of these are limestones, one of which comes from a quarry operated by Turunen, Inc. in Pelkie, Mich., and the other of which has an unknown origin and was obtained from a Corps of Engineers armor stone pile on the Hancock Canal in Hancock, Mich.

A fifth sample type was used as a very low absorptivity specimen. This is a natural quarry tile obtained from a local flooring dealer. These tiles are used for other chemical testing at KRC. They are slightly rough and very homogenous. They were chosen after years of testing to simulate the micro surface roughness of concrete pavement surfaces.

Absorptivities were measured for all of these five test samples and are contained in Table 2. The value is given as a percent of total weight of aggregate and was determined using a 24 hour soak period. This table also contains the test names given to each sample for use during the rest of this report.

TABLE 2

Aggregate Descriptions

| Aggregate source | Test Name | Absorptivity % (24 hr) |
|---|---|---|
| Quarry Tile | TS-A | 0.27 |
| Levy Co. | TS-B | 5.49 |
| London Agg. | TS-C | 4.42 |
| Turunen, Inc. | TS-D | 1.73 |
| Corps of Eng. | TS-E | 1.22 |

Chemicals

Four chemicals were chosen for use in these tests. Liquids were chosen for this particular test, although other physical states of the chemicals may be utilized in conjunction with the invention. Liquid chemicals can be applied most uniformly to the surface of the aggregate samples. The four chemicals chosen for use in this example were liquid calcium magnesium acetate (CMA), potassium acetate (KA), propylene glycol with a urea additive (PGU), and liquid sodium chloride (NaCl).

Frost Mitigation

To determine how well a combination of aggregate and chemical reacts to the formation of frost, a number of tests were performed in the frost chamber. Aggregate coupons were placed into the chamber after being saturated with chemical in order to determine if frost would grow. For all tests, untreated coupons were also placed into the box to assure that frost was growing in the unit. After the set of tests were completed with saturated surfaces, the samples were washed and the samples were re-tested.

The first set of tests was conducted with the five test samples and four chemicals. Aggregate coupons were soaked in chemical for 24 hours to ensure a thorough covering of deicer. The samples were then removed and allowed to air dry. After this drying period, the soaked samples were placed in the frost chamber at 20° F. and left for 21 hours. Untreated coupons of the five stones were also placed in the chamber for comparison. The results are given in Table 3.

The first five entries in the table are the aggregate coupons that have had no chemical applied. Frost has grown on these samples as expected. The next 14 entries are for combinations of chemical and aggregate. The TS-B sample used with KA broke during testing and resulted in no values for this combination. None of the samples with chemical showed any frost growth. The D and E samples showed some wetness on the surface. This particular set of tests did not include NaCl.

Table 4 contains a similar set of results. In this test, the samples from the test in Table 3 were cleaned with the saturated sponge 25 times and the test was repeated. For this test, the results are the same as the previous set, with the exception of the TS-A samples. The washings removed enough chemical from these low absorptivity coupons and freezing has occurred. The D and E samples were again covered by small beads of water. These samples have absorptivities that are low enough that precipitated moisture does not soak in as it does on the B and C samples.

Table 5 is a test after 50 sponges (25 added to the previous test). All of the scenarios remain the same with the exception of the TS-B samples. The TS-B samples were washed to the point where freezing has occurred.

Table 6 contains the final set of data after another 25 sponge cleanings totaling 75. The results show a similar trend to the previous three tests.

TABLE 3

Frost Results - No Sponge Cleanings

| Sample | Number of Sponges | Time in Frost Box (hr) | Frost Chamber Temp ° F. | Results |
|---|---|---|---|---|
| TS-D Base | 0 | 21 | 20 | Layer of frost over entire sample surface. |
| TS-E Base | 0 | 21 | 20 | Layer of frost over entire sample surface. |
| TS-C Base | 0 | 21 | 20 | Layer of frost over entire sample surface. |
| TS-B Base | 0 | 21 | 20 | Layer of frost over entire sample surface. |
| IS-A Base | 0 | 21 | 20 | Layer of frost over entire sample surface. |

TABLE 3-continued

Frost Results - No Sponge Cleanings

| Sample | Number of Sponges | Time in Frost Box (hr) | Frost Chamber Temp ° F. | Results |
|---|---|---|---|---|
| TS-D/PGU | 0 | 21 | 20 | No frost. Water beads on sample. |
| TS-D/LA | 0 | 21 | 20 | No frost. Water beads on sample. |
| TS-D/CMA | 0 | 21 | 20 | No frost. Water beads on sample. |
| TS-E/PGU | 0 | 21 | 20 | No frost. Water beads on sample. |
| TS-E/KA | 0 | 21 | 20 | No frost. Water beads on sample. |
| TS-E/CMA | 0 | 21 | 20 | No frost. Water beads on sample. |
| TS-C/PGU | 0 | 21 | 20 | No frost. |
| TS-C/KA | 0 | 21 | 20 | No frost. |
| TS-C/CMA | 0 | 21 | 20 | No frost. |
| TS-B/PGU | 0 | 21 | 20 | No frost. |
| TS-B/CMA | 0 | 21 | 20 | No frost. |
| TS-A/PGU | 0 | 21 | 20 | No frost. |
| TS-A/KA | 0 | 21 | 20 | No frost. |
| TS-A/CMA | 0 | 21 | 20 | No frost. |

TABLE 4

Frost Results - 25 Sponge Cleanings

| Sample | Number of Sponges | Time in Frost Box (hr) | Frost Chamber Temp ° F. | Results |
|---|---|---|---|---|
| TS-D Base | 25 | 28.5 | 20 | Layer of frost over entire sample surface. |
| TS-E Base | 25 | 28.5 | 20 | Layer of frost over entire sample surface. |
| TS-C Base | 25 | 28.5 | 20 | Layer of frost over entire sample surface. |
| TS-B Base | 25 | 28.5 | 20 | Layer of frost over entire sample surface. |
| TS-A Base | 25 | 28.5 | 20 | Layer of frost over entire sample surface. |
| TS-D/PGU | 25 | 28.5 | 20 | No frost. Water beads on sample. |
| TS-D/KA | 25 | 28.5 | 20 | No frost. Water beads on sample. |
| TS-D/CMA | 25 | 28.5 | 20 | No frost. Water beads on sample. |
| TS-E/PGU | 25 | 28.5 | 20 | No frost. Water beads on sample. |
| TS-E/KA | 25 | 28.5 | 20 | No frost. Water beads on sample. |
| TS-E/CMA | 25 | 28.5 | 20 | No frost. Water beads on sample. |
| TS-C/PGU | 25 | 28.5 | 20 | No frost. |
| TS-C/KA | 25 | 28.5 | 20 | No frost. |
| TS-C/CMA | 25 | 28.5 | 20 | No frost. |
| TS-B/PGU | 25 | 28.5 | 20 | No frost. |
| TS-B/CMA | 25 | 28.5 | 20 | No frost. |
| TS-A/PGU | 25 | 28.5 | 20 | Ice layer covering sample. |
| TS-A/KA | 25 | 28.5 | 20 | Ice layer covering sample. |
| TS-A/CMA | 25 | 28.5 | 20 | Ice layer covering sample. |

TABLE 5

Frost Results - 50 Sponge Cleanings

| Sample | Number of Sponges | Time in Frost Box (hr) | Frost Chamber Temp ° F. | Results |
|---|---|---|---|---|
| TS-D Base | 50 | 30 | 20 | Layer of frost over entire sample surface. |
| TS-E Base | 50 | 30 | 20 | Layer of frost over entire sample surface. |
| TS-C Base | 50 | 30 | 20 | Layer of frost over entire sample surface. |
| TS-B Base | 50 | 30 | 20 | Layer of frost over entire sample surface. |
| TS-A Base | 50 | 30 | 20 | Layer of frost over entire sample surface. |
| TS-D/PGU | 50 | 30 | 20 | No frost. Water beads on sample. |
| TS-D/KA | 50 | 30 | 20 | No frost. Water beads on sample. |
| TS-D/CMA | 50 | 30 | 20 | No frost. Water beads on sample. |
| TS-E/PGU | 50 | 30 | 20 | No frost. Water beads on sample. |
| TS-E/KA | 50 | 30 | 20 | No frost. Water beads on sample. |
| TS-E/CMA | 50 | 30 | 20 | No frost. Water beads on sample. |

TABLE 5-continued

Frost Results - 50 Sponge Cleanings

| Sample | Number of Sponges | Time in Frost Box (hr) | Frost Chamber Temp ° F. | Results |
|---|---|---|---|---|
| TS-C/PGU | 50 | 30 | 20 | No frost. |
| TS-C/KA | 50 | 30 | 20 | No frost. |
| TS-C/CMA | 50 | 30 | 20 | No frost. |
| TS-B/PGU | 50 | 30 | 20 | Ice layer covering sample. |
| TS-B/CMA | 50 | 30 | 20 | Ice layer covering sample. |
| TS-A/PGU | 50 | 30 | 20 | Ice layer covering sample. |
| TS-A/KA | 50 | 30 | 20 | Ice layer covering sample. |
| TS-A/CMA | 50 | 30 | 20 | Ice layer covering sample. |

TABLE 6

Frost Results - 75 Sponge Cleanings

| Sample | Number of Sponges | Time in Frost Box (hr) | Frost Chamber Temp ° F. | Results |
|---|---|---|---|---|
| TS-D Base | 75 | 72 | 20 | Layer of frost over entire sample surface. |
| TS-E Base | 75 | 72 | 20 | Layer of frost over entire sample surface. |
| TS-C Base | 75 | 72 | 20 | Layer of frost over entire sample surface. |
| TS-B Base | 75 | 72 | 20 | Layer of frost over entire sample surface. |
| TS-A Base | 75 | 72 | 20 | Layer of frost over entire sample surface. |
| TS-D/PGU | 75 | 72 | 20 | No frost. Water beads on sample. |
| TS-D/KA | 75 | 72 | 20 | No frost. Water beads on sample. |
| TS-D/CMA | 75 | 72 | 20 | No frost. Water beads on sample. |
| TS-E/PGU | 75 | 72 | 20 | No frost. Water beads on sample. |
| TS-E/KA | 75 | 72 | 20 | No frost. Water beads on sample. |
| TS-E/CMA | 75 | 72 | 20 | No frost. Water beads on sample. |
| TS-C/PGU | 75 | 72 | 20 | No frost. Moist surface. |
| TS-C/KA | 75 | 72 | 20 | No frost. Moist surface. |
| TS-C/CMA | 75 | 72 | 20 | No frost. Moist surface. |
| TS-B/PGU | 75 | 72 | 20 | Layer of frost over entire sample surface. |
| TS-B/CMA | 75 | 72 | 20 | Layer of frost over entire sample surface. |
| TS-A/PGU | 75 | 72 | 20 | Ice layer covering sample. |
| TS-A/KA | 75 | 72 | 20 | Ice layer covering sample. |
| TS-A/CMA | 75 | 72 | 20 | Ice layer covering sample. |

A second set of frost growth tests was performed using the same aggregates as above with NaCl as the deicer. Coupons of each of the five test aggregates were coated with NaCl and placed in the frost box at 20° F. After 24 hours, frost had formed on all of the samples with the exception of some spots on the TS-E limestone. This test coupon has a small vein of darker and visibly different material through part of its interior. This vein did not grow frost. This indicates that a difference in stone may still show a no frost result even with NaCl. The frost on the coupons was more soft and loose compared to frost on untreated coupons. This indicates that there is still melt potential, but not enough to totally prevent frost growth.

A second test was devised using the coated coupons. The coupons were dried a second time but not washed. The dried samples were placed in the frost box at 25° F. and after 24 hours were all moist with no frost formed. The temperature was then dropped to 23° F. and the samples left for 24 hours. At this point, light frost formed on all of the test coupons. This frost was again quite loose and bordered on "slushy." The veins on the TS-E sample again showed no frost growth.

Bond Strength Reduction

The graphs of FIGS. 8-25 are the results for the representative tests of the five final aggregates and four liquid chemicals. Each graph is depicted with a code such as TS-A/CMA (FIG. 8). This is aggregate type TS-A with CMA applied. The graphs also each contain a line that is the "Baseline." This is the average of a set of five tests performed on the coupon with no chemical applied. The solid black line shows the linear regression of the data, while the equation for this line is also given.

Turning specifically to FIG. 8, which is indicative of the other Figures, the purple line with data points plotted as boxes is the baseline. This is the average bond strength of ice to this particular sample with no chemical applied. The blue line and diamond shaped data points are the load values for each test pull after the surface is washed. For instance, the first blue diamond is the de-bonding load after one washing (five sponge passes). The black line is the linear regression of the data. This line is plotted to show the trend of the return to baseline. The CMA, KA, and PGU were all tested at an interval of one washing (five sponges) between each shear test. The NaCl tests were performed at a more rapid pace due to time constraints caused by adding this chemical late in the test scope. The NaCl was tested at no washings, one washing and then at three, five and every two washings after that. This was accomplished by simply doubling the washes between tests.

FIGS. 8-11 show the data for the TS-A samples and the four chemicals. All four of these samples show a rapid return to baseline with a limited number of washings. In general, they have all gone back to a "no chemical" state with 15 washings or less.

FIGS. 12-14 show the results for the TS-B samples. As mentioned previously, the coupon used for KA broke during testing. Tests were performed on this coupon at zero, one and two washes. The results were 18, 41, and 65 pounds, respectively. No graph is included for this test. The baseline was 145. The coupon used for NaCl also broke after 10 washings (FIG. 14). The three figures for this aggregate show a rapid return to baseline in all cases. The KA test was also nearly half way back to baseline after two washings. The broken coupons were not re-tested due to time and material constraints.

FIGS. 15-18 show the TS-C sample test data. These four tests show a better residual effect than the A & B samples.

The results for the TS-D samples are given in FIGS. 19-22. All four of these combinations still function properly after 17 washings. The TS-E results are shown in FIGS. 23-25.

This testing clearly shows that certain combinations of aggregate and deicing chemical can drastically reduce the formation of frost on pavements, as well as minimize the bond potential between ice and the pavement.

Frost growth tests show that in some cases, the occurrence of frozen water vapor precipitation (hoar frost or rime ice deposit) is nearly eliminated. Some limestones in combination with freezing point depressants show no freezing even after numerous washings. As a result, these applications can be used on bridge decks that are highly susceptible to frost, thereby keeping the deck ice free through numerous storm events. In contrast, testing on low absorptive samples show rapid re-freezing after only a few washings.

The same potential holds true for the reduction of bond strength with a single chemical application. In general, the same scenarios work well for residual effect for bond reduction as do for frost mitigation. In both cases, the limestones with medium absorptivities perform well with all chemicals tested under this scope. FIGS. 10 and 19 are good examples of the contrast between combinations. In FIG. 10 the residual effect is nearly gone after four washings. On the other hand, the combination in FIG. 19 is still working very well after 17 washings.

For both the frost and bond reduction testing, the tile samples were chosen to simulate a non-absorptive pavement, e.g., a pavement or bridge deck consistently covered with frost and icing for nearly every frost or freezing event even after chemicals were applied on the previous event. Any chemical that was applied has been washed off and there is little or no residual effect left. Considering the results for the tile samples, this is a good assumption. First, frost grows on these samples after the first set of washings. For the bond reduction the bond strength rises to a level comparable to the "no chemical" state after only a few washings. This is shown graphically by the trend given by the linear regression of the data. These regression lines show how rapidly a combination returns to the "no chemical" state after application of chemical. A steep line depicts a poor tendency for residual effect with a flat slope showing good chemical retention.

FIGS. 23 and 25 show combinations resulting in excellent residual reduction in bond strength. These are the TS-E limestones with CMA and NaCl. Both of these show bond strengths well below the baseline values even after 16 washings. This means that the pavement simulated by the tile samples could be coated with one of these aggregate/chemical combinations and the residual bonding could be drastically reduced. The CMA can eliminate frost down to 20° F. on this aggregate while the NaCl may eliminate frost down to about 23° F. In any case, both of these, and several other combinations tested show that a much safer pavement can be obtained by coating pavements that exhibit "poor" residual effect with "anti-icing" smart aggregate/chemical combinations.

Example 2

In another example, an 8 foot by 200 foot test section of anti-icing composition was applied to the edge of the tarmac at the FAA Technical Center in Atlantic City. For this example, Pro-Poxy Type III DOT epoxy obtained from Unitex, in Kansas City, Mo., was used as adhesive and applied to the tarmac substrate. More particularly, the adhesive was poured onto the tarmac, and then spread and thinned. The thickness of the adhesive on the tarmac was about ⅛ inch. Approximately 7500 pounds of crushed limestone aggregate obtained from Michigan Limestone Operations, Inc. was then broadcast onto the adhesive by sprinkling the aggregate out of a bucket. The thickness of the aggregate was about ½ inch, until it was ground to about ¼ inch to about ⅜ inch. The anti-icing chemical used in conjunction with this example will be chosen at a later date by FAA. About 5 gallons of this anti-icing composition will be sprayed using a chemical or tank sprayer onto the overlay prior to winter weather. The anti-icing chemical may or may not re reapplied. The FAA will be performing friction tests and icing tests on this section during the upcoming winter to complete the in field proof of concept.

Example 3

Also, connected to this test are two wear tests designed to determine how durable and resistant to wear these coatings are when installed on a pavement. MDOT personnel will perform one of these tests at the Michigan Department of Transportation (MDOT) pavement lab in Lansing, Mich. This is the standard test for aggregate wear and polishing for the State of Michigan. The other wear test will include a field test section near KRC that will monitor traffic and plowing on an actual road surface. These two tests should demonstrate are designed to prove that that overlays are durable and will not wear out rapidly.

Example 4

Another anti-icing composition is likely to be laid in the near future on a bridge deck for the Wisconsin Department of Transportation. The anti-icing composition would coat a twenty-four foot by one hundred and eighty foot bridge deck. The composition will likely be the same as the one applied in Example 2. The epoxy will be Pro-Poxy Type III DOT epoxy obtained from Unitex and the aggregate will likely be obtained form Northeast Asphalt in Shawano, Wis., and will be similar to that used in Example 2.

I claim:

1. A method of inhibiting or preventing bonding between snow or ice and a substrate, the method comprising:
applying an adhesive comprising at least one of an epoxy, styrene, methyl-methacrylate, tar, or a combination thereof to the substrate;
broadcasting an aggregate comprising at least one of limestone, dolomite, or a combination thereof onto the adhesive, the aggregate being adapted to retain and release an anti-icing chemical in an amount effective to inhibit or prevent bonding between snow or ice and the substrate.

2. The method of claim 1, further comprising applying an anti-icing chemical onto the aggregate.

3. The method of claim 2, wherein the anti-icing chemical comprises at least one of calcium magnesium acetate, potassium acetate, sodium acetate, sodium chloride, sodium formate, magnesium chloride, propylene glycol, propylene glycol with urea additive, ethylene glycol with urea additive, potassium carbonate, and combinations thereof.

4. The method of claim 1, wherein the substrate comprises pavement.

5. The method of claim 1, wherein the substrate includes a surface on which a vehicle may travel.

6. The method of claim 5, wherein the surface includes at least one of a road, a bridge, an airport runway, and a tarmac.

7. The method of claim 1, further comprising applying a second adhesive and broadcasting a second aggregate, the second adhesive and second aggregate being the same as or different from the adhesive and aggregate.

8. The method of claim 1, wherein broadcasting comprises at least one of sprinkling, dropping, and/or spraying aggregate over the adhesive.

9. The method of claim 1, wherein the aggregate is adapted to exhibit a chemical residual effect.

10. A method of inhibiting or preventing bonding between snow or ice and a substrate, the method comprising:
   applying an adhesive to the substrate; and
   broadcasting an aggregate onto the adhesive, the aggregate having a portion encompassed by the adhesive and a portion not encompassed by the adhesive, the portion not encompassed by the adhesive being positioned to receive and retain an anti-icing chemical in an amount effective to inhibit or prevent bonding between snow or ice and the substrate,
   wherein the aggregate comprises limestone, dolomite, or a combination thereof.

11. The method of claim 10, wherein the adhesive comprises at least one of an epoxy, styrene, methyl-methacrylate, tar, or a combination thereof.

12. The method of claim 10, wherein the aggregate exhibits a chemical residual effect.

13. The method of claim 10, further comprising applying an anti-icing chemical onto the aggregate.

* * * * *